(12) United States Patent
Nilsson

(10) Patent No.: US 6,772,991 B1
(45) Date of Patent: Aug. 10, 2004

(54) TAPPING DEVICE

(76) Inventor: Roy Nilsson, Fulltofta 409, S-242 94 Horby (SE)

( * ) Notice: Subject to any disclaimer, the term of this patent is extended or adjusted under 35 U.S.C. 154(b) by 16 days.

(21) Appl. No.: 10/363,449
(22) PCT Filed: Aug. 29, 2001
(86) PCT No.: PCT/SE01/01832
§ 371 (c)(1), (2), (4) Date: Feb. 28, 2003
(87) PCT Pub. No.: WO02/18830
PCT Pub. Date: Mar. 7, 2002

(30) Foreign Application Priority Data

Sep. 1, 2000 (SE) ............................................... 0003124

(51) Int. Cl.[7] ............................................. F16K 31/44
(52) U.S. Cl. ........................ 251/236; 251/279; 251/298
(58) Field of Search ................................. 251/236, 279, 251/298, 231, 332

(56) References Cited

U.S. PATENT DOCUMENTS

| | | | | |
|---|---|---|---|---|
| 1,766,165 A | * | 6/1930 | Beebe | 251/236 |
| 2,114,900 A | * | 4/1938 | William | 251/279 |
| 2,121,553 A | * | 6/1938 | Stewart et al. | 251/279 |
| 2,908,478 A | * | 10/1959 | Delbert | 251/279 |
| 4,671,461 A | * | 6/1987 | Hennuy et al. | 251/236 |

* cited by examiner

Primary Examiner—John Bastianelli
(74) Attorney, Agent, or Firm—Rolf Fasth; Fasth Law Offices

(57) ABSTRACT

The valve (1) has a valve casing (2), a cone (4) with a shaft (40) emanating from the Cone (4), and a seat (20). The valve has a control element (3) for moving the cone (4) to and from the seat (20). The control element (3) comprises a first leg (30) located outside the valve casing (2) and a second leg (31) which is at least partially located inside the valve casing (2). The second leg (31) passes through and is firmly attached to an elastic and springing-back wall section (21) on the valve casing (2) which faces the seat (20) and its lower end (310) merges into the shaft (40) via a joint (5). When the valve is closed the springing-back wall section (21) presses the cone (4) against the seat (20) via the second leg (31) and the shaft (40).

4 Claims, 4 Drawing Sheets

TAPPING DEVICE

BACKGROUND OF THE INVENTION

There is a need in many situations for a valve, which can be easily moved between an open and closed position.

SUMMARY OF THE INVENTION

The present invention sets out an invention, which fulfils such a requirement.

BRIEF DESCRIPTION OF THE FIGURES

The invention will be described in detail below with reference to the attached drawings in which.

DETAILED DESCRIPTION

Figure 1:
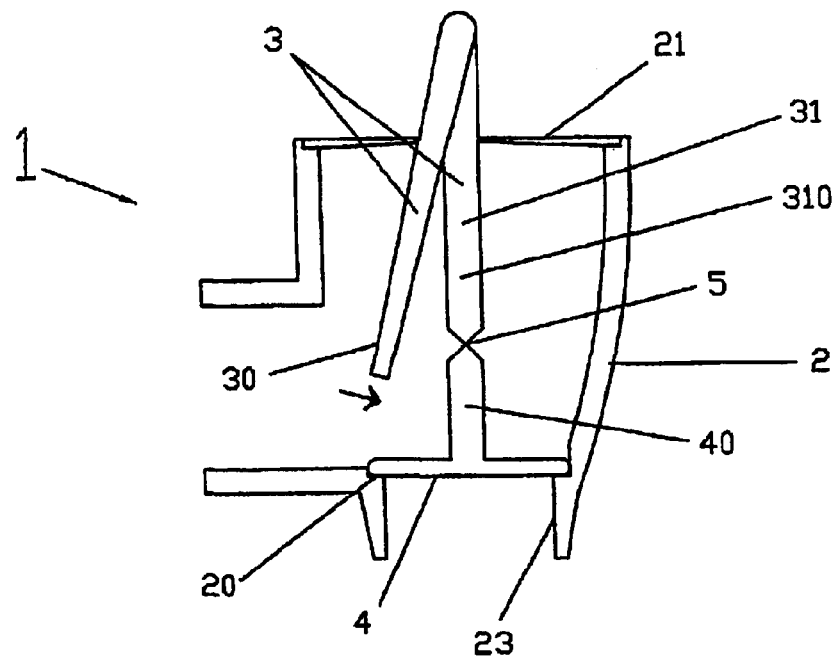
FIG. 1 shows a longitudinal section illustrating the principle of a valve in the closed position.
Figure 4:
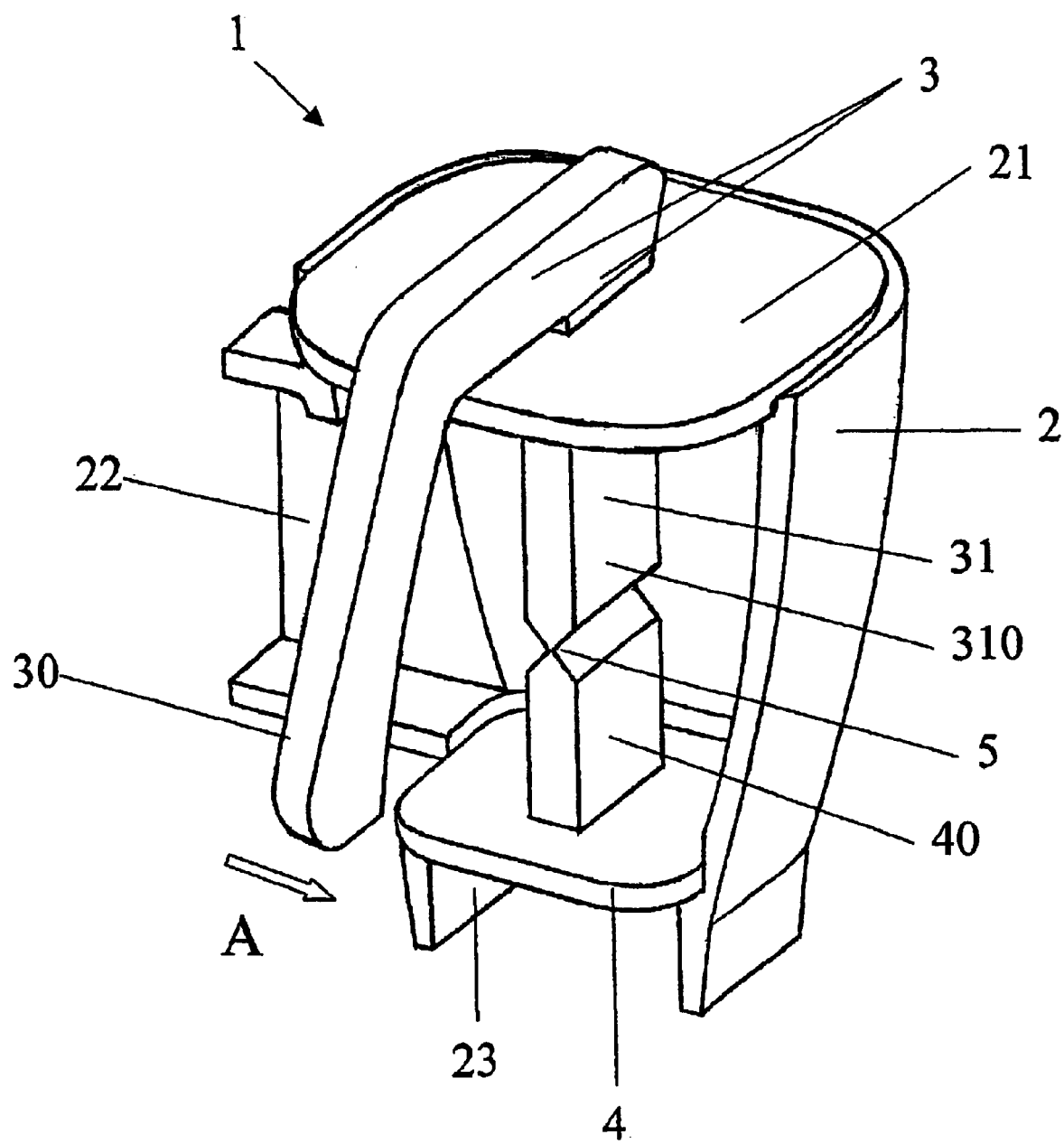
FIG. 4 shows a cut-out view of the valve.

In the figures a valve (1) with a valve casing (2) is shown with a seat (20), against which a cone (4) rests in FIGS. 1 and 4. Emanating from the cone is a shaft (40), which is firmly attached to the cone. As a rule, the cone is generally shaped as a quadrangle.

A control element (3) has a leg (30) located outside the casing and a second leg (31) at least partly located inside of the casing. The two legs are immovably attached to each other. In the lower end (310) of the second leg the leg is connected to the shaft (40). At the transition between the leg and the shaft there is a joint (5). This second leg is fixed in a sealing and firm manner to an elastic springing back wall section (21) facing the seat (20). In the position shown in FIGS. 1 and 4, the wall section (21) is tensioned in order to exert a downward force on the second leg (31) and thereby via the joint (5) and the shaft (40) to press the cone (4) against the seat (20).

In a preferred embodiment of the invention, the second leg (31) and the shaft (40) form a unit, which has a thinner section which forms the joint (5).

The figures also show an inlet (22) to the valve and an outlet (23) from the valve.

Figure 2:
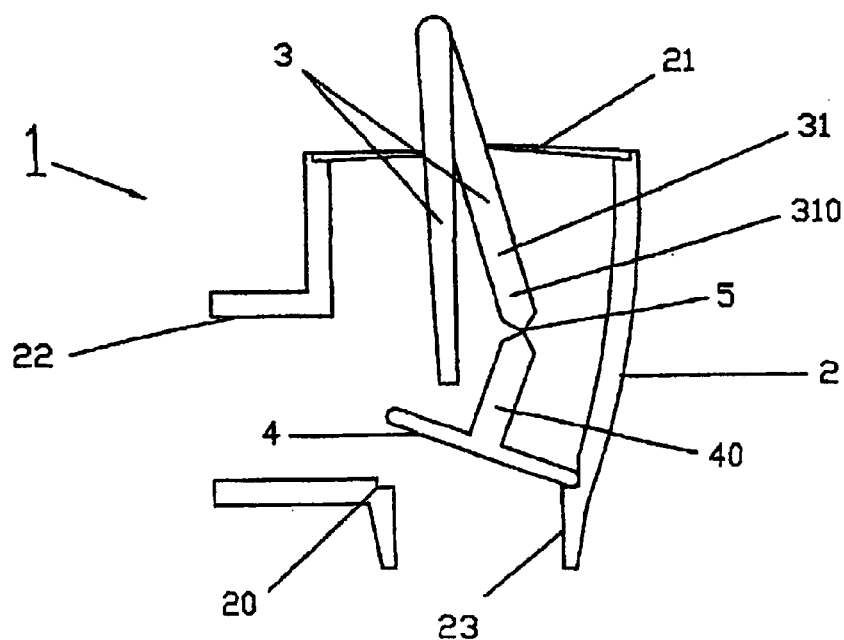
FIG. 2 shows a longitudinal section of the valve in a semi-open position.

The first leg (30) has a lower section (300, FIG. 5), which in FIGS. 1 and 4 is located slightly to the left in relation to the second leg (31). In FIG. 2 the first leg is moved into the direction of the arrow A (FIG. 4) and takes up a mainly perpendicular direction, while the leg in FIG. 3 has its lower section moved still further to the right in the figure.

Figure 3:
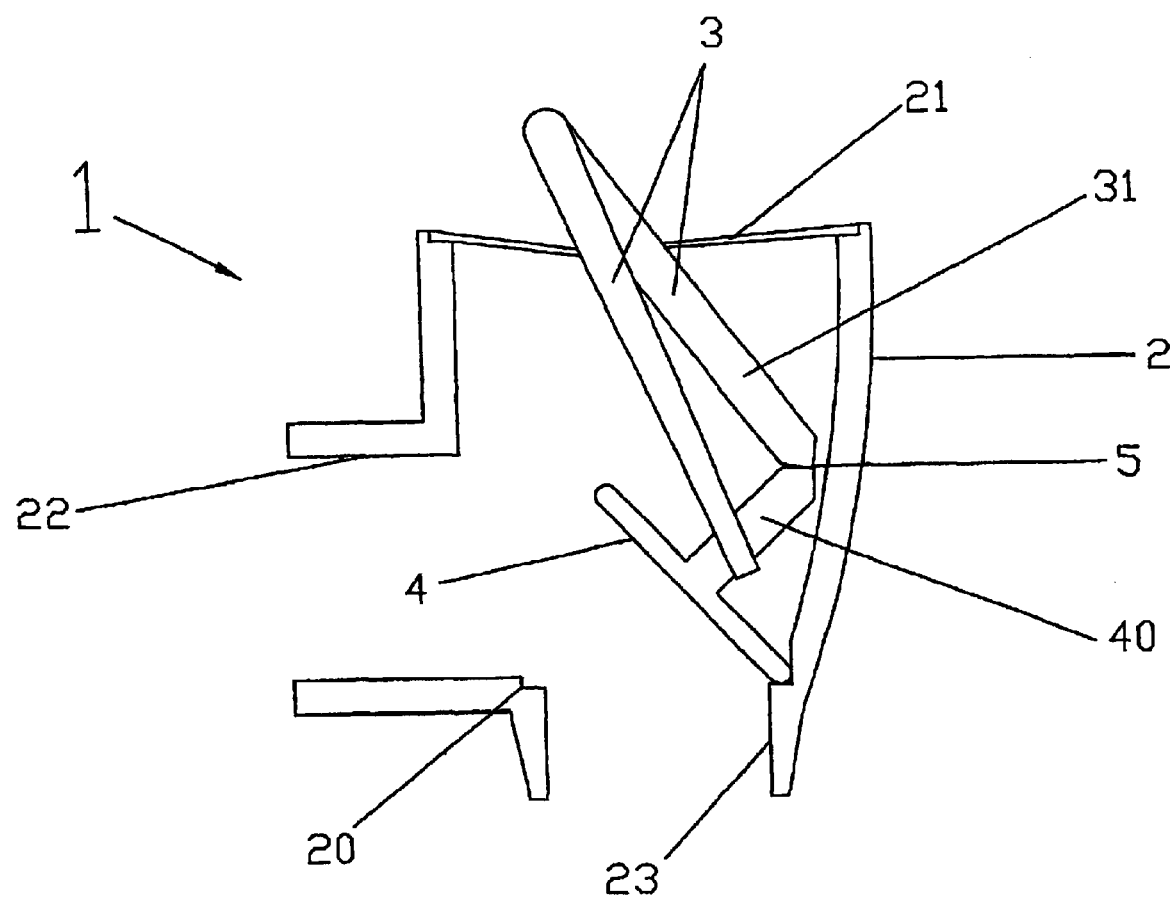
FIG. 3 shows a longitudinal section of the valve in the fully open position.

In FIG. 1 the cone (4) rests against the seat (20) all along the entire circumference of the seat, i.e. the valve is closed. In FIG. 2 the cone has been lifted up slightly and the valve is partially open, and in FIG. 3 the cone is in the position in which the valve is fully open. In FIG. 2 the joint (5) is in a position which involves the wall section (21) being distended upwards in the figure owing to the fact that the movement of the first leg (30) means that the cone (4) and the shaft (40) are lifted upwards. In FIG. 2 the wall section (21) is in a position in which the section is maximally distended. In FIG. 3 the shaft (40) and the cone (4) have been turned more in relation to the seat (20) whereby the distension of the wall section (21) is decreased. The fact that maximum distension of the springing-back wall section (21) occurs when the valve is only partially open is due to the fact that the length of the shaft (40) and the size of the cone (4) are adapted so that this effect is achieved. Said dimensions are as a rule also adjusted in such a way that the cone (4) rests against a part of the seat (20) during both movement from the seat to the maximum open position and during movement back to the fully closed position.

The lower section (300) of the first leg (30) has two end positions, the first one corresponding to the position in which the valve is fully closed (FIG. 1) and the other end position corresponding to the position in which the valve is fully open (FIG. 3). The movement of the lower section (300) of the first leg (30) stops in its one end position when the cone comes to rest fully against the seat (20), and in its other end position when the joint (5) reaches the wall of the valve casing.

As a rule, the control element (3), the cone (4) with the shaft (40) and the wall section (21), generally form an integral unit, which during manufacturing of the valve is joined to the valve casing, e.g. through welding together of the wall section (21) with the remaining part of the valve casing. In this way a very simple and inexpensive valve construction is achieved. In addition it is possible to use one and the same plastic material for the two components joined together during the manufacturing of the valve, which facilitates recycling of the material.

Figure 5:
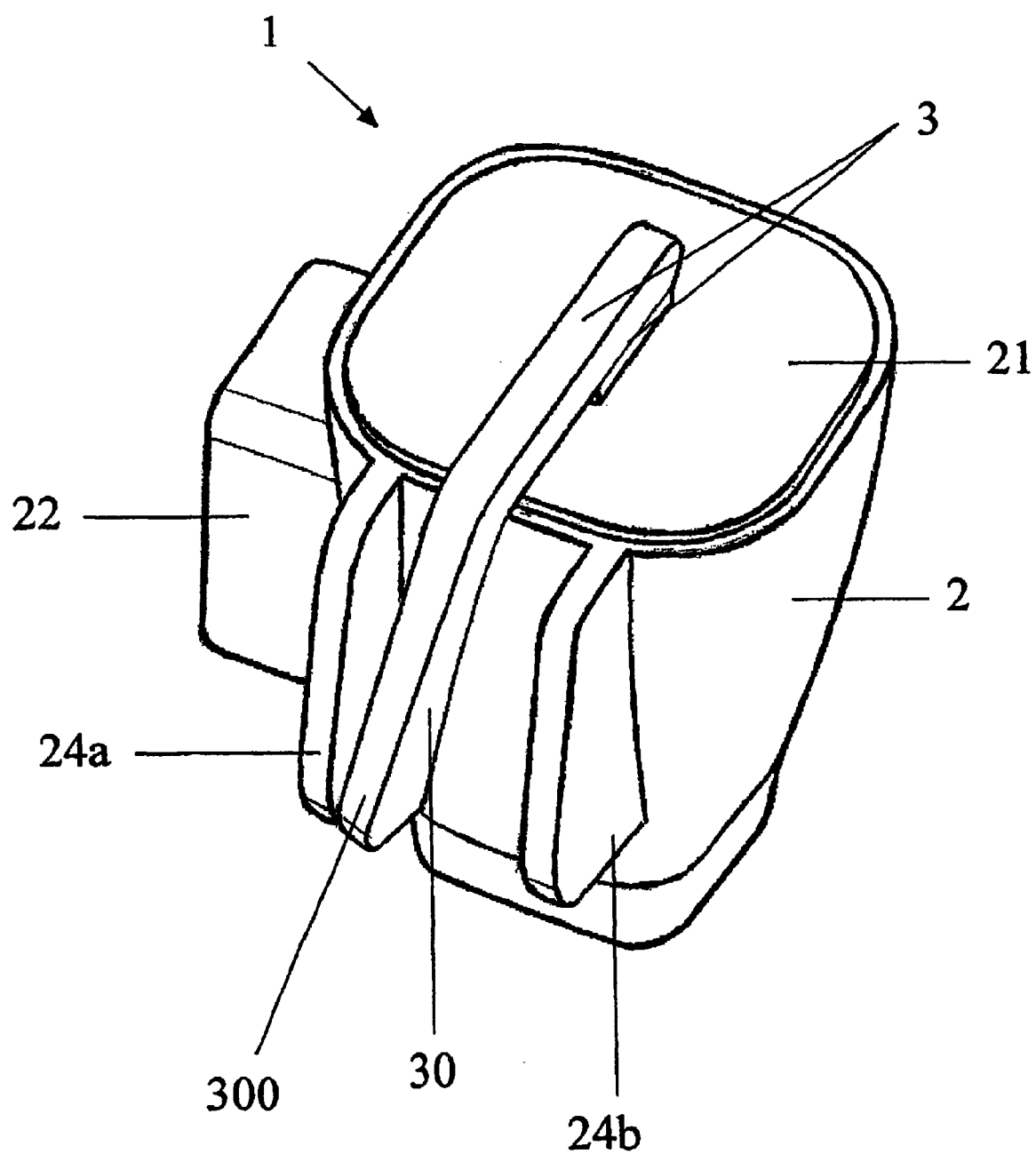
FIG. 5 shows a form of embodiment of the valve in which it is provided with finger supports.

In FIG. 5 a form of embodiment of the valve is shown when it is provided with finger supports (24a) and (24b) to facilitate easier use of the control element (3). One finger support (24a) is placed to the left of the first leg (30), and the other finger support (24b) is placed to the right of the first leg. In the position in which the valve is closed at least the lower section (300) of the first leg is located relatively near the finger support (24a) and in the position in which the valve is fully open at least the lower section (300) is located near the finger support (24b). However, the distance between the finger supports is no greater so that one can normally grip the first leg and some of the finger supports with the thumb and forefinger and move the first leg by moving the fingers towards each other. Both finger supports are also arranged in such a way that the distance between a finger support and the first leg (30) is relatively small when the first leg is in its end position.

The form of embodiment described in the preceding section has the advantage that the valve can be opened simply with one hand. Even when liquid is to be drawn from a light container with small content of liquid, just one hand can be used to open the valve at the same time as avoiding the container moving as a result of the force applied on the leg (30) of the control element (3). The other hand can be used for handling the vessel into which the liquid is to be drawn.

In forms of embodiment in which the cone is in the form of a quadrangle, the seat (20) naturally also forms a quadrangle. The seat is arranged relative to the first leg (30) so that the movement of the lower part (300) of the leg takes place in a direction that is mainly perpendicular to the direction of one of the seat's contact surfaces.

As has already been stated, the position of wall section (21) in FIG. 2 is the position in which the section is most distended, which means that the cone is in an unstable position. The pressure force exerted by section 21 on the second leg 31 means that the cone (4) has a tendency to move either to the fully open or fully closed position. The magnitude of the force exerted by the distended wall section (21) is relatively small compared with the force required for manually opening or closing the valve with the aid of the control element (3).

The design described above also makes a very short outlet (23) possible. In this way the accumulation of liquid in the outlet under the cone and subsequent dripping is avoided.

The above-described operation of the valve with the thumb and forefinger is also advantageous if the valve is used for small packs of liquid as the use of only one hand means that it is easier to observe how drawing off of the liquids is proceeding.

From the above description and figures it can be seen that a simple and secure operation of the valve is achieved.

The simple structure of the valve also means that the flow that can pass through the valve is great in relation to the size of the valve.

In the above description the terms "upper", "lower", "downwards", "left" and other corresponding expressions have been used. These terms are only used to simplify the description and only relate to the orientation in the figures. It is evident to an expert in the field that the valve and the elements constituting the valve can have an orientation deviating from that shown in the figures.

The above detailed description has only referred to a limited number of forms of embodiment of the invention, but it is easily understood by an expert in the field that the invention covers a large number of forms of embodiments within the framework of the following claims.

What is claimed is:

1. Valve (1) comprising a valve casing (2), a cone (4) with a shaft (40) emanating from the cone, a seat (20) and a control element (3) for moving the cone (4) to and from a resting position on the seat (20), characterized in that the control element (3) comprise a first leg (30) located outside the valve casing (2) and a second leg (31), which is at least partially located within the valve casing (2), that one end (310) of the second leg (31) merges into the shaft (40) and that the second leg (31) passes through and is firmly attached to an elastic and springing-back wall section (21) on the valve casing (2) which faces the seat (20) and which when the valve is closed presses the cone (4) against the seat (20) via the second leg (31) and the shaft (40).

2. Valve (1) according to claim 1, characterized in that the second leg (31) merges into the shaft (40) in a joint (5) and that the length of the shaft (40) is selected in such a way that on moving the control element (3) for opening the valve, before the valve is fully open the joint (5) moves into a position in which the springing-back wall section (21) is fully distended.

3. Valve (1) according to claim 1, characterized in that the control element (3), the springing-back wall section (21), the shaft (40) and the cone (4) form an integral unit.

4. Valve (1) according to claim 1, characterized in that a finger support (24a, 24b) is arranged on both sides of the first leg (30) of the moving element (3) at a distance from the leg (30) making it possible to grip the first leg (30) and some of the finger supports (24a, 24b) with the thumb and forefinger, end then move the first leg (30) by moving the fingers towards each other.

\* \* \* \* \*